Sept. 26, 1944.  L. V. TOWT  2,358,947
METHOD OF EXTRACTING VANILLA FLAVORING WITH
MENSTRUUM OF LOW ALCOHOLIC CONTENT
Filed April 1, 1942

INVENTOR
LOUIS V. TOWT

By Hazard and Miller

ATTORNEYS.

Patented Sept. 26, 1944

2,358,947

UNITED STATES PATENT OFFICE 2,358,947

METHOD OF EXTRACTING VANILLA FLAVORING WITH MENSTRUUM OF LOW ALCOHOLIC CONTENT

Louis V. Towt, Los Angeles, Calif., assignor, by mesne assignments, to C. V. Goffinet and Ruth Goffinet, both of San Gabriel, Calif.

Application April 1, 1942, Serial No. 437,208

3 Claims. (Cl. 99—140)

This invention relates to a method of extracting vanilla flavoring from vanilla beans with a menstruum of low, if any, alcoholic content.

Heretofore, a conventional manner of extracting vanilla flavoring from vanilla beans has been to either grind or chop the vanilla beans and to heat them to a temperature of approximately 130° F. in a menstruum containing approximately 45% alcohol. This process extracts from the vanilla beans the vanillin and other extractive material including coloring matter and vanilla resins. An objection to the process is that the use of such a high percentage of alcohol renders the extract expensive. Even after the extract is obtained it is necessary to age it due to the fact that when the extract is first obtained the odor and flavor of the alcohol predominate. With aging the vanilla predominates over the alcohol.

It has consequently been desirable to produce a vanilla flavor employing a menstruum that has a low alcoholic content if any at all. With such a procedure the cost of manufacturing the vanilla flavoring is greatly reduced and the aging of the flavoring, can be eliminated entirely. Vanilla flavors have heretofore been produced having a water menstruum or a menstruum low in alcoholic content, but such flavors have been manufactured by extracting the flavor from the vanilla bean using a menstruum of a high alcoholic content, then part of the alcohol would be removed usually by distillation.

The present invention has for its object the extraction of the vanilla flavor from vanilla beans employing a menstruum that is either entirely water or has a low alcoholic content ranging from zero to 20% whereby reduction in cost of manufacture is accomplished and aging or distribution of the alcohol portion of the menstruum is entirely eliminated. By the improved process a vanilla flavoring is obtained which is readily marketable and which is ready for immediate use, possessing all of the desirable characteristics of vanilla flavorings or vanilla extracts manufactured in accordance with conventional process.

Figure 1:
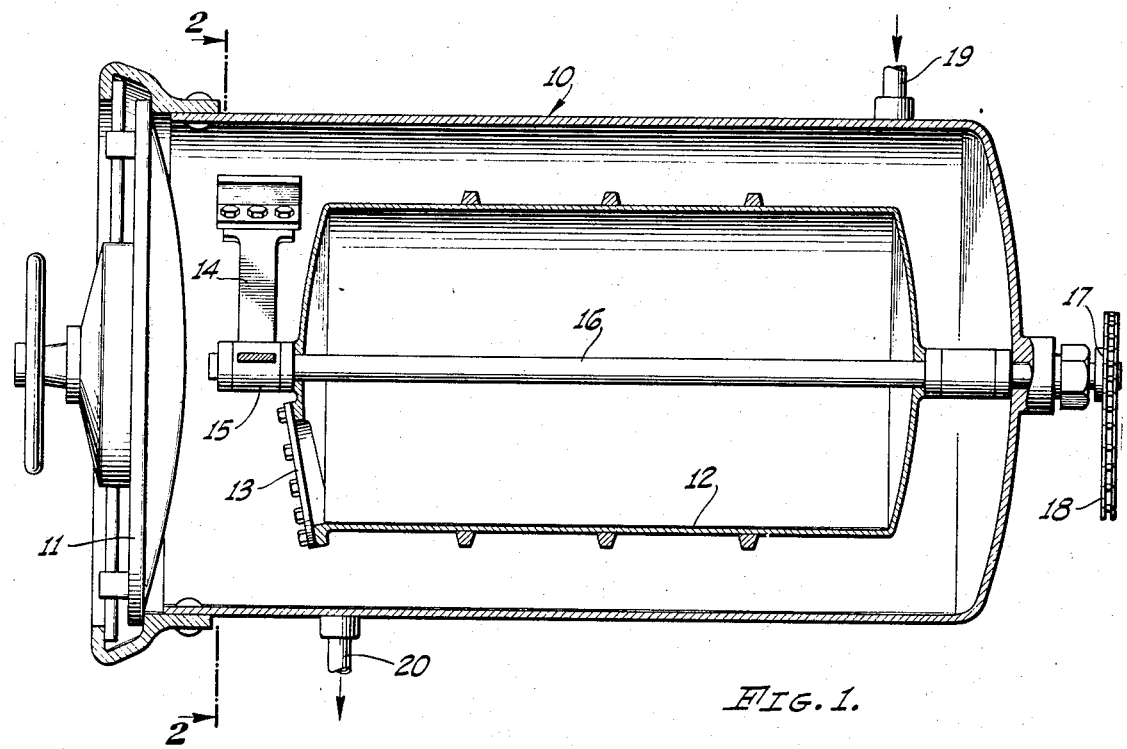
Figure 2:
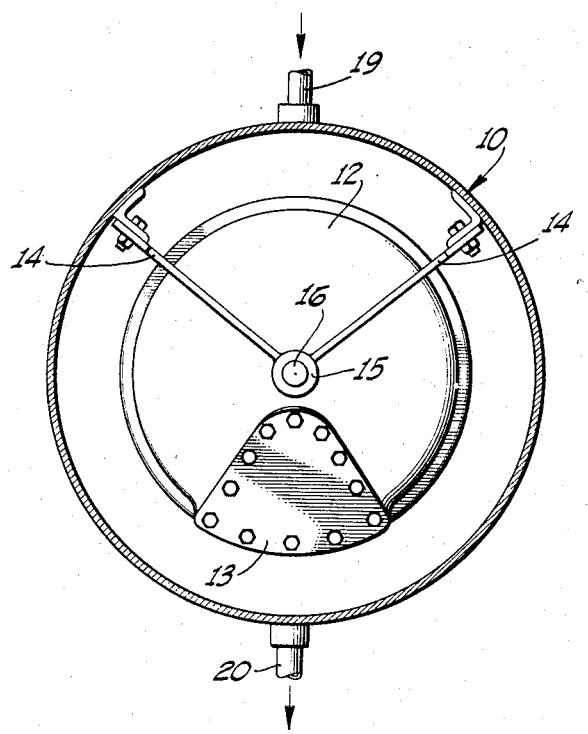

With the foregoing and other objects in view, which will be made manifest in the following detailed description and specifically pointed out in the appended claims, reference is had to the accompanying drawing for an illustrative embodiment of the invention, wherein:

Figure 1 is a longitudinal vertical section through a typical form of apparatus that may be employed to perform the improved process of extracting vanilla flavoring in accordance with the present invention; and Fig. 2 is a transverse vertical section through the same taken substantially upon the line 2—2 upon Fig. 1.

Referring to the accompanying drawing wherein similar reference characters designate similar parts throughout, 10 indicates a suitable container having a door 11 which serves to close the container and seal it against the escape of internal pressure. The container 10 and its door 11 may, if desired, conform in construction to the conventional autoclave. Within the container there is disposed a rotatable drum 12 having a removable door 13. This door when applied serves to hermetically seal the drum. Within the container 10 there is a suitable bearing support or bearing hanger 14 for a bearing 15. A shaft 16 extends longitudinally through the drum and projects from either end thereof providing front and rear trunnions. The forward trunnion is rotatable in the bearing 15 and the rear trunnion extends through the back of container 10 where it is equipped with a sprocket 17 driven by an endless chain 18 from a suitable source of power, not shown. 19 and 20 indicate respectively a steam inlet and outlet whereby steam may be conducted into and out of container 10.

In performing the process embodying the present invention the vanilla beans are chopped or ground and are mixed with a menstruum composed of water entirely or water with from zero to 20% alcohol. The proportion of vanilla beans to menstruum will vary considerably, depending upon the degree of concentration of the flavoring that it is desired to obtain. For a simple flavoring the proportions are 13½ ounces of vanilla beans per gallon of menstruum. This mixture is placed in the rotatable drum 12 and the doors 13 and 11 are then installed so as to hermetically seal the drum 12 and container 10. The drum is then continuously rotated so as to continuously agitate the finely divided vanilla beans and the menstruum. Steam is supplied to the container 10 through the inlet 19 at a temperature of 250° F. and at a pressure of approximately 15 pounds gauge. This serves to heat the contents of the drum 12 while it is agitated. The pressure within the drum 12 may and usually does, exceed fifteen pounds gauge pressure. Under normal conditions, the contents of the drum 12 are subjected to this temperature for a period of approximately two hours, at which time it will be found that the extraction of the flavoring material from the vanilla beans is substantially completed. The extraction of the flavoring material in this length of time is a decided time-saving advantage over extracting the flavor from vanilla beans with a cold menstruum containing approximately 45% alcohol. The use of the cold menstruum having the high alcoholic content usually involves a period of from 48 to 72 hours to secure complete extraction which is reduced to approximately two hours by the method herein disclosed.

By using higher temperatures the extraction may be completed in less time and if lower temperatures are employed, more time is required to complete the extraction.

At the end of the two hour period during which the contents of drum 12 have been continuously agitated and subjected to the high temperature and pressure the contents of the drum 12 are drawn off and the menstruum filtered from the finely divided vanilla beans, thus producing the vanilla flavor. This vanilla flavor is then ready for immediate use. No aging is required. It will be found that all of the vanillin in the vanilla beans has been extracted and that all of the extractive material which precipitates lead from a lead actate solution is also extracted so that when the vanilla flavoring is subjected to the conventional test applied to vanilla extracts, namely, its ability to precipitate lead from a lead acetate solution the improved flavoring compares favorably with vanilla extracts extracted by means of menstruums containing high alcoholic contents.

In the improved method of manufacturing vanilla flavoring it is doubtful if all of the vanilla resins are extracted for the reason that many of these resins are soluble in alcohol but not in water. If the menstruum contains as high as 20% of alcohol a substantial portion of the vanilla resins will be extracted by the improved process, but if the percentage of alcohol in the menstruum is very low, most of the vanilla resins will not be extracted. Sufficient color is extracted by the improved process to produce a salable product. The flavoring produced is dark brown but not as dark as a vanilla extract produced by using a high alcoholic menstruum. By the use of high heat and pressure apparently more flavoring material is extracted from the vanilla beans than with processes employing high alcoholic menstruums and lower temperatures at atmospheric conditions.

It will be appreciated that by the improved process the cost of manufacture can be greatly reduced in that the amount of alcohol utilized is very much smaller. Furthermore, the aging can be entirely eliminated and any distillation of the alcohol is entirely eliminated.

The high temperature and pressure under which the flavoring is obtained produces a flavoring initially sterile. However, in placing the flavoring in bottles or other containers under which it is marketed there is danger of some contamination even from the air. Consequently it is desirable to have a preservative of some character introduced which may be the small amount of alcohol present in the menstruum itself, or the addition of glycerine in sufficient proportions to effectively cause the flavoring to be adequately preserved.

It will be manifest that the improved process is in no way restricted to the use of the particular apparatus disclosed. The apparatus employed may vary considerably but it is desirable to be able to continuously agitate the beans and menstruum in a container that is hermetically sealed while the contents of the container are being subjected to a relatively high temperature above the boiling point of water.

Various changes may be made in the details of construction without departing from the spirit or scope of the invention as defined by the appended claims.

I claim:

1. The method of extracting vanilla flavoring from vanilla beans which includes subjecting finely divided vanilla beans and a water menstruum containing from zero to 20% alcohol to a temperature above the boiling point of water and at a pressure above atmospheric until the flavoring has been substantially all extracted from the beans.

2. The method of extracting vanilla flavoring from vanilla beans which includes subjecting finely divided vanilla beans and a water menstruum containing from zero to 20% alcohol to a temperature of approximately 250° F. for about two hours.

3. The method of extracting vanilla flavoring from vanilla beans which comprises subjecting finely divided vanilla beans and a water menstruum containing from zero to 20% alcohol to a temperature of approximately 250° F. for about two hours and at a pressure above atmospheric, and agitating the beans and menstruum during such period.

LOUIS V. TOWT.